US008732408B2

(12) United States Patent
Karlapalem et al.

(10) Patent No.: US 8,732,408 B2
(45) Date of Patent: May 20, 2014

(54) CIRCUIT AND METHOD WITH CACHE COHERENCE STRESS CONTROL

(75) Inventors: Sainath Karlapalem, Bangalore (IN); Andrei Sergeevich Terechko, Eindhoven (NL)

(73) Assignee: Nytell Software LLC, Wilmington, DE (US)

( * ) Notice: Subject to any disclaimer, the term of this patent is extended or adjusted under 35 U.S.C. 154(b) by 1038 days.

(21) Appl. No.: 12/682,789

(22) PCT Filed: Oct. 16, 2008

(86) PCT No.: PCT/IB2008/054251
§ 371 (c)(1),
(2), (4) Date: Aug. 9, 2010

(87) PCT Pub. No.: WO2009/050665
PCT Pub. Date: Apr. 23, 2009

(65) Prior Publication Data
US 2010/0299485 A1 Nov. 25, 2010

(30) Foreign Application Priority Data
Oct. 18, 2007 (EP) .................................... 07118763

(51) Int. Cl.
*G06F 12/00* (2006.01)
(52) U.S. Cl.
USPC .................................. 711/141; 711/E12.026
(58) Field of Classification Search
USPC ....................................................... 711/141
See application file for complete search history.

(56) References Cited

U.S. PATENT DOCUMENTS

| 5,875,467 A | 2/1999 | Merchant |
| 6,332,178 B1 * | 12/2001 | Dean et al. .................... 711/118 |

(Continued)

FOREIGN PATENT DOCUMENTS

| WO | 99/41669 A1 | 8/1999 |
| WO | 00/08564 A1 | 2/2000 |
| WO | 2006/104747 A2 | 5/2006 |
| WO | 2006/090328 A2 | 8/2006 |

OTHER PUBLICATIONS

Jim Handy, "The Cache Memory Book: The Authoritative Reference on Cache Design", Second Edition, 1998, pp. 156-187.*

(Continued)

*Primary Examiner* — Edward Dudek, Jr.
*Assistant Examiner* — Christopher Birkhimer
(74) *Attorney, Agent, or Firm* — McAndrews, Held & Malloy, Ltd.

(57) ABSTRACT

A circuit contains a shared memory (12), that is used by a plurality of processing elements (10) that contain cache circuits (102) for caching data from the shared memory (12). The processing elements perform a plurality of cooperating tasks, each task involving caching data from the shared memory (12) and sending cache message traffic. Consistency between cached data for different tasks is maintained by transmission of cache coherence requests via a communication network. Information from cache coherence requests generated for all of said tasks is buffered. One of the processing elements provides an indication signal indicating a current task stage of at least one of the processing elements. Additional cache message traffic is generated adapted dependent on the indication signal and the buffered information from the cache coherence requests. Thus conditions of cache traffic stress may be created to verify operability of the circuit, or cache message traffic may be delayed to avoid stress.

32 Claims, 3 Drawing Sheets

(56) References Cited

U.S. PATENT DOCUMENTS

| | | | |
|---|---|---|---|
| 6,463,509 B1 * | 10/2002 | Teoman et al. | 711/137 |
| 6,467,032 B1 * | 10/2002 | Lippert | 711/150 |
| 6,760,812 B1 * | 7/2004 | Degenaro et al. | 711/133 |
| 6,871,268 B2 * | 3/2005 | Iyengar et al. | 711/146 |
| 7,000,079 B2 * | 2/2006 | Detjens et al. | 711/141 |
| 7,024,521 B2 * | 4/2006 | Glasco | 711/145 |
| 2003/0097527 A1 | 5/2003 | Bushey et al. | |

OTHER PUBLICATIONS

Scherrer, A. et al. "A Generic Multi-Phase On-Chip Traffic Generation Environment"; Application-Specific Systems, Architectures and Processors, IEEE, pp. 23-27 (Sep. 2006).

International Search Report and Written Opinion for Int'l. Patent Appln. No. PCT/IB2008/054251 (Jun. 2009).

* cited by examiner

CIRCUIT AND METHOD WITH CACHE COHERENCE STRESS CONTROL

FIELD OF THE INVENTION

The invention relates to a circuit with a shared memory and a data processing circuit that defines and a plurality of processing elements that each comprise a cache circuit for caching data from the shared memory.

BACKGROUND OF THE INVENTION

WO 2006090328 provides a data processing circuit with a test device with a buffer for information from cache coherence requests from processing elements that are coupled to a shared memory. Typical examples of a cache coherence request are snoop request signals issued to determine whether inconsistent copies of data are present in different cache circuits, invalidation signals for selected cache lines, update signals for data in cache lines etc. The circuit of WO 2006090328 may be a circuit that actually contains such a shared memory circuit and a plurality of processing elements with cache circuits or it may be a circuit that simulates the operation of a circuit with a plurality of processing elements that each comprise a cache circuit for caching data from the shared memory. A simulating circuit may be obtained for example by using a programmable computer programmed to perform operations corresponding to the operations of all of the processing elements.

The test device of WO 2006090328 is used during verification of the circuit, i.e. when it is investigated whether the circuit will not malfunction under extreme circumstances. The test device is designed to stress the circuit by issuing additional cache coherence requests. The information from cache coherence requests in the buffer is used to select addresses for which cache coherence requests will be generated and/or to predict times when there is expected to be a high number of cache coherence requests, in order to generate cache coherence requests selectively at such times. Accordingly, the test circuit is designed to use the content of the buffer to adapt the issuing of cache coherence requests.

The test device of WO 2006090328 contains a configuration register that makes it possible to switch the test device between different modes of operation. The modes may define a method of filtering cache coherence requests, i.e. selecting requests that may be ignored. For example the modes may include a burst mode wherein cache coherence requests from a selected address range are ignored to avoid that all requests are in the same range of addresses, another burst mode wherein cache traffic with contiguous addresses is generated, or a mode wherein cache coherence requests that are not of a specific desired type are ignored.

WO 2006090328 mentions various methods to decide on a switch between modes. For example the test device may react to the occurrence of too many invalidate requests by switching to a different mode. It is also noted that the operation mode can be defined by outside configuration. Thus, different stress situations may be simulated under control of the designer.

The circuit of WO 2006090328 has the disadvantage that it can only adapt the issue of simulated cache coherence requests reactively to previous cache coherence requests or by outside reconfiguration. In this way the test device may fail to provide maximum stress. It also does not make it possible to make use of periods of low stress.

SUMMARY OF THE INVENTION

Among others, it is an object to provide for a circuit with a shared memory that defines a plurality of processing elements that each comprise a cache circuit for caching data from the shared memory, wherein a more refined adaptation to cache coherence request stress can be realized.

A circuit according to claim 1 is provided. This circuit provides for the coordinated execution of respective tasks on different processing elements that each have their own cache circuit. Herein a cache message traffic generator is used that adapts the generation of cache message traffic dependent on information from a coherency request buffer with information from cache coherence requests from all processing elements and a signal provided by at least one of the processing elements that indicates the currently executing task stage. In an embodiment the cache message traffic generator generates only cache coherence messages. As the task stages of the at least one of the processing elements are executed in coordination with the tasks in the other processing elements, this makes it possible to make more refined implicit or explicit predictions of the type of cache message traffic that will occur than is possible in the purely reactive predictions based on buffered cache coherence requests only. Accordingly a more refined adaptation of cache message traffic is possible.

In an embodiment the buffered information comprises addresses used in the cache coherence requests. In this embodiment the addresses used in the generated cache message traffic are adapted dependent on the indication signal and the addresses from the cache coherence request buffer. In an embodiment the addresses are selected from addresses in the buffer.

In an embodiment a filter is provided for selecting the cache coherence requests that will be passed to the buffer. In this embodiment the filter is switched to a filter mode dependent on the indication signal about the executing task stage. Thus, when the cache message traffic is adapted based on buffered information it will be indirectly adapted to the executing task stage through the selection of the filter mode.

In an embodiment the cache message traffic generator may be configured to verify operation by stressing the circuit though the generation of additional cache messages, which may contain addresses that also occur in cache coherence requests due to execution of the tasks. This may be done in a circuit that actually comprises a plurality of processing elements with cache circuits or in a circuit that simulates such a circuit with a plurality of processing elements, using for example a programmable processor circuit that contains a program that defines the multiple processing elements and makes the processor simulate events during execution of tasks by processing elements.

In an embodiment a predicted frequency of cache message traffic is determined implicitly or explicitly dependent on the indication signal and buffered information. In this embodiment the cache message traffic generator may delay execution of an operation that involves generation of cache message traffic while the predicted frequency is above a threshold. In an embodiment a prediction of addresses used in cache coherence requests is made implicitly or explicitly, based on the currently executing task stage and the information from the coherency request buffer. In this embodiment execution of an operation may be delayed while the prediction predicts cache message traffic with addresses in the predetermined range.

In an embodiment the at least one of the processing elements comprises an instruction processor configured to execute a program of instructions to perform its task plus the function of the cache message traffic generator. Thus, communication between different program parts may be used to provide for more refined adaptation of cache message generation.

In an embodiment the tasks include an image data formatting and/or deformatting task, executed by said at least one of the processing elements and a task for handling pixel data and/or transform coefficients for the pixel data image data coefficient, executed by one of the processing elements other than said at least one of the processing elements. This may involve MPEG encoding and/or decoding for example. The different pixel data and/or transform coefficient handling tasks, such as DCT coefficient computation, its inverse, variable length encoding and decoding, motion estimation, motion compensation etc will be executed in coordination with a formatting task or a task for extracting data from formatted data. By using this formatting or extraction task to provide signals that assist in adaptive coherence request based cache message generation, cache message generation can be adapted to all of the subtasks.

BRIEF DESCRIPTION OF THE DRAWINGS

These and other objects and advantageous aspects will become apparent from a description of exemplary embodiments, using the following drawing, wherein.

DETAILED DESCRIPTION OF EXEMPLARY EMBODIMENTS

Figure 1:
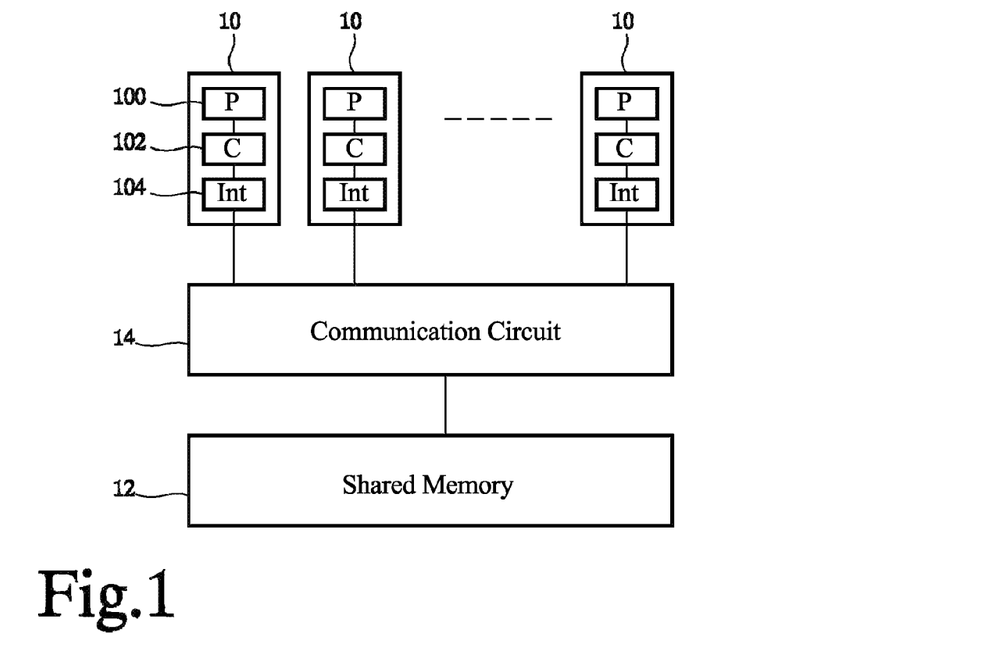
FIG. 1 shows a multi-processor circuit

FIG. 1 shows a multiprocessing circuit comprising a plurality of processing elements 10, a shared memory 12 and a communication circuit 14 coupling processing elements 10 to shared memory 12. Each processing element 10 comprises a processing circuit 100, a cache circuit 102 and a communication interface 104. In at least one of the processing elements processing circuit 100 is an instruction processor configured to execute a program of instructions, but the processing circuit 100 of other processing elements may be dedicated hardware circuits that do not require a program to control their operation. Cache circuit 102 is coupled between the processing circuit 100 and communication interface 104, which is coupled to communication circuit 14.

Each cache circuit 102 performs a conventional cache function: it retains copies of data from shared memory 12 in a cache memory in cache circuit 102, it locally handles read operations from the processing circuit 100 that address shared memory 12, if a copy is available and consults shared memory 12 if not. Cache circuit 102 manages replacement, updates and invalidation of cache data. Operation of such cache circuits is known and described for example in WO 2006090328. Therefore only a few aspects of the operation will be discussed here.

Inconsistencies between cached data may arise when a processing circuit 100 executes a write operation that addresses a memory location in shared memory and a copy of data for the same shared memory location is also stored in the cache circuit 102 of another processing element. Cache circuits may correct this in different ways. A message with the address of the data may be transmitted from the processing element 10 that has updated the data to all cache circuits 102 that the data must be invalidated or updated if present. Such a message may be transmitted selectively to the processing elements 10 for which it is known that they have copies of the data, or they may be broadcast to all processing elements 10.

Alternatively write access messages to addresses in shared memory 12 may be supplied via communication circuit 14 to processing elements 10 for monitoring purposes and the cache circuits 102 may invalidate or update cached data when it is detected that another processing element 10 writes data to an address in a range related to the cached data.

Snoop acknowledge messages may be returned from the other processing elements 10 to indicate the presence of cached data.

Any messages over communication circuit 14 that may be used by the processing elements 10 to maintain consistency will be called cache coherence requests herein. Cache message traffic messages include cache coherence requests and other traffic such as messages to load data from shared memory 12 into cache circuits 102 that are not cache coherence requests, if they do not affect consistency.

Figure 2:
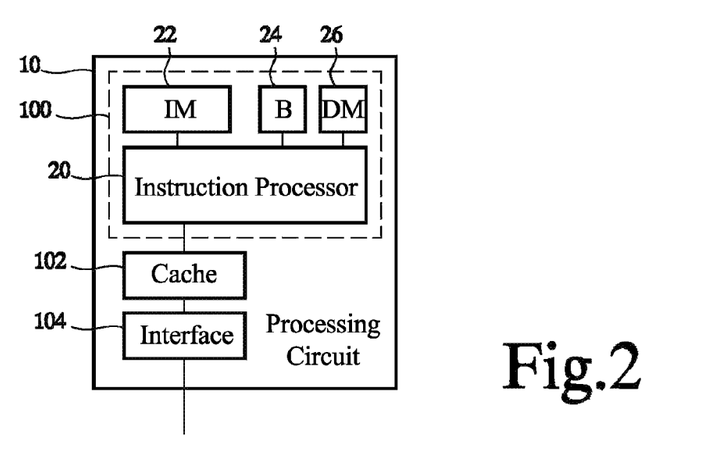
FIGS. 2, 2a shows a processing element

FIG. 2 shows a processing element with the cache circuit 102 and the communication interface 104 and additionally an instruction processor 20, a program memory 22, a cache coherence buffer 24 and a configuration data memory 26. Although a separate configuration data memory 26 is shown for the sake of illustration it should be understood that this memory may be part of a larger memory, such as a scratchpad memory of the processing element. In addition, or instead. the processing element may have an IO interface circuit that is accessible from instruction processor 20 as memory mapped IO space.

Configuration data memory 26 may also correspond to locations in shared memory 12. Similarly, instruction memory 22 may be part of any larger memory. Instruction processor 20 is coupled to cache circuit 102, program memory 22, cache coherence buffer 24 and configuration data memory 26. Cache circuit 102, program memory 22 cache coherence buffer 24 and configuration data memory 26 are shown coupled to communication interface 104.

In operation a cache coherence buffer 24 buffers cache coherence requests, or information, such as addresses derived from these requests, that have been transmitted via communication circuit 14, as described for the test device of WO 2006090328. It should be emphasized that cache coherence buffer 24 may be distinct from any buffer for pending requests, so that buffering is independent of whether the old request have been processed. In a distinct buffer, information may be retained even if the corresponding requests are no longer pending, or, when there are many requests, the information may be overwritten while the corresponding requests are still pending.

Instruction processor 20 is programmed to execute a plurality of processing tasks in time division multiplexed manner. A program to configure instruction processor 20 to do so may be present in instruction memory 22. Different ones of the tasks communicate using configuration data memory 26. The tasks include a first task involving processing of data that is addressed in shared memory 12. This may be an image signal processing task, an audio signal processing task, a video and/or audio coding or decoding task for example.

Typically, the first task only implements part of an image signal processing operation, an audio signal processing operation, a video and/or audio coding or decoding operation, other parts being implemented by other tasks, which are executed in correlation with the first task by processing elements 10 other than the processing element 10 that executes the first task.

The first task includes generation of events that trigger other ones of the tasks in the processing element 10 and/or writing of status information for use by other ones of the tasks. A second task in the processing element 10 involves generation of message traffic via communication circuit 14.

Figure 3:
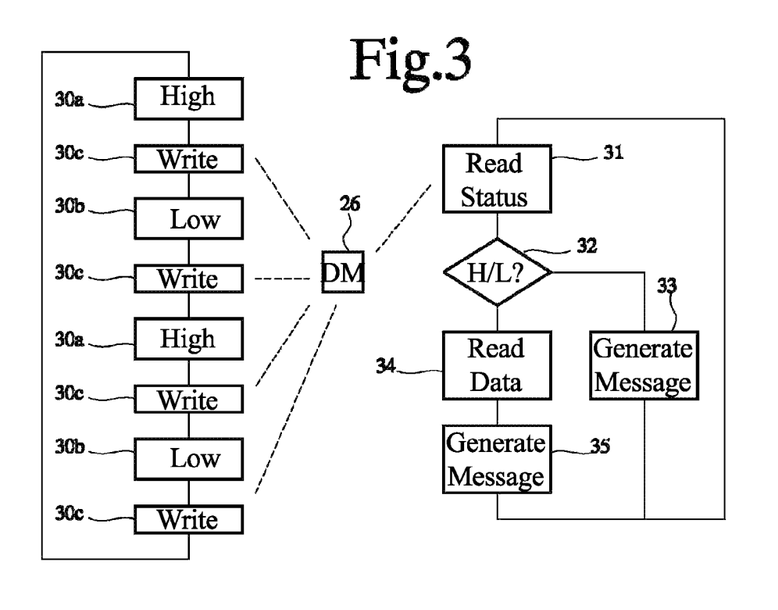
FIGS. 3, 4 show flow-charts of task execution

FIG. 3 shows a flow chart of execution of the first task and a first embodiment of such a second task. A number of stages 30a-c of the first task are shown wherein instruction processor 20 executes instructions that implement the different stages. The first task makes different use of cached data in first ones of the stages 30a compared to second ones of the stages 30b. The first ones of the stages may for example be stages where data from shared memory 12 is first loaded or updated at a high rate (e.g. during motion compensation in image decompression) and the second ones of the stages may be stages wherein data in shared memory 12 is not frequently updated (e.g. during computation of a DCT transform). Between the first and second ones of the stages 30a,b the instruction processor 20 executes third ones of the stages 30c to write status information to configuration data memory 26, indicating the type of next stage 30a,b.

In a first step 31 of the second task the instruction processor 20 executes an instruction to read status information from configuration data memory 26. In a second step 32 the instruction processor 20 executes an instruction to compare the status information with predetermined information.

If the status information indicates that first ones of the stages 30a are executed, the second task proceeds to a third step 33 wherein instruction processor 20 executes instructions that cause cache message traffic messages, such as coherence requests over communication circuit 14, at a predetermined rate and with addresses from a selected address range, e.g. a range that is known to be used in the first ones of the stages 30a or predicted to be used. Optionally, only a specific type of cache message traffic messages is generated.

If the status information indicates that second ones of the stages 30b are executed, the second task proceeds to a fourth step 34 wherein instruction processor 20 executes instructions to read information from cache coherence buffer 24. In a fifth step 35 of the second task instruction processor 20 executes instructions that cause cache message traffic messages, such as coherence requests over communication circuit 14, at a rate dependent on a result of statistics of the information in cache coherence buffer 24 and/or with addresses derived from information in cache coherence buffer 24. Optionally, only a specific type of cache message traffic messages. From the third and fifth step 33, 35 the second task returns to first step 31.

As will be appreciated this has the effect of adapting generation of cache message traffic message dependent on both the stage of execution of the first task and the actual cache coherence messages, in that the addresses in the cache message traffic message are adapted and/or the frequency of type of messages is adapted. However, it should be appreciated that the second task shown in FIG. 3 is merely presented by way of simple example of adaptive generation of cache message traffic messages. In other embodiments the rate at which cache message traffic is generated may be a predetermined function of a combination of the state of the first task and information derived from cache coherence buffer 24, as defined by the second task.

Figure 2A:
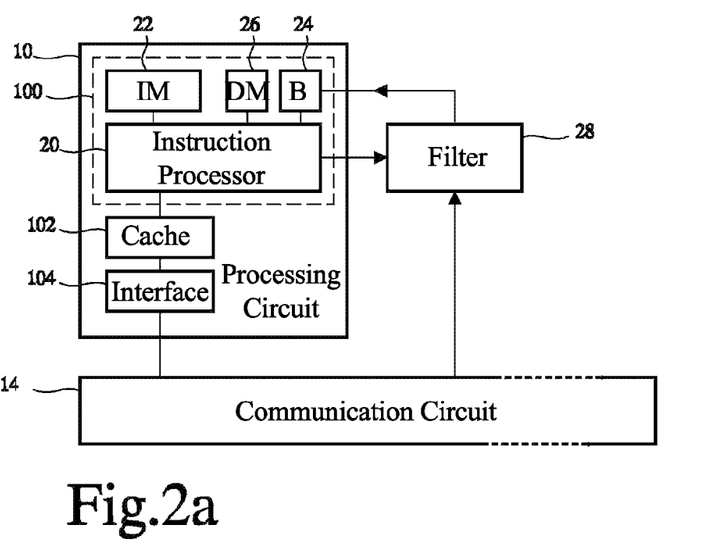

FIG. 2a shows an embodiment wherein a filter 28 is provided, coupled between the communication circuit 14 and the cache coherence request buffer 24. Instruction processor 20 has an output coupled to a control input of filter 28. This may be realized for example by mapping a control register of filter 28 to a register of instruction processor 20.

Communication circuit 14 is configured to pass copies of cache coherence requests, or information therefrom to filter 28. Filter 28 is configured to pass selected cache coherence requests or information therefrom to cache coherence request buffer 24. Filter is configured to operate in different, selectable filter modes. As used herein different filter modes define different ways of selecting cache coherence requests or information therefrom, resulting in different sets of selected cache coherence requests or information therefrom. In an embodiment, one of the filter modes is an all pass mode and another filter mode is an address filter mode, wherein cache coherence requests with addresses in a selected range are not passed to cache coherence request buffer 24. Another filter mode may be a repetition filter mode, wherein cache coherence requests are blocked if they comprise an address that is the same as an address used within a predetermined number of previously received cache coherence requests, or in a same address ranges as an address used within a predetermined number of previously received cache coherence requests.

In operation, instruction processor 20 selects the filter mode dependent on program status of the first task. Thus, the generation of cache message traffic may be adapted indirectly, through selection of cache coherence requests.

In an embodiment the second task may involve computation of statistics of cache coherence requests. The computation of the statistics may include computation of correlations between program states, as indicated in configuration data memory 26, with observed cache coherence requests. Thus for example, a frequency of requests, or an address range, an average address etc. of shared memory addresses in the requests may be computed respectively for each of a plurality of program states. Accordingly, the second task may contain instructions to cause instruction processor 20 to select addresses in generated cache message traffic message and/or a rate of cache message traffic messages and/or a type of cache message traffic messages dependent on the state of the first task and the statistics gathered for that state. Statistics may be collected over a period extending to past cache coherence requests, which are no longer in cache coherence buffer 24. In addition to, or instead of, use of such past statistics, the second task may use the current information from cache coherence in cache coherence buffer 24 or statistics of the current information to control cache message traffic.

In an embodiment instruction processor 20 reads information from individual cache coherence requests from cache coherence buffer 24 under control of instructions and it computes the statistics under control of other instructions. In an alternative embodiment, a specialized statistics computation circuit (not shown) may be coupled between cache coherence buffer 24 and instruction processor 20, configured to gather information from cache coherence buffer 24 and to compute statistics. The statistics computation circuit may be part of the processing element 10 or of the communication circuit 14. In this embodiment instruction processor 20 is coupled to the specialized statistics computation circuit to read the results of the statistics computations, for example by reading request counts, average address values or bounds of address ranges from registers in the specialized statistics computation circuit. In this case, the computational load of the instruction processor 20 is reduced.

However, computation of statistics by instruction processor 20 has the advantage that statistics may be computed that are more adapted to the needs of the second task.

Figure 4:
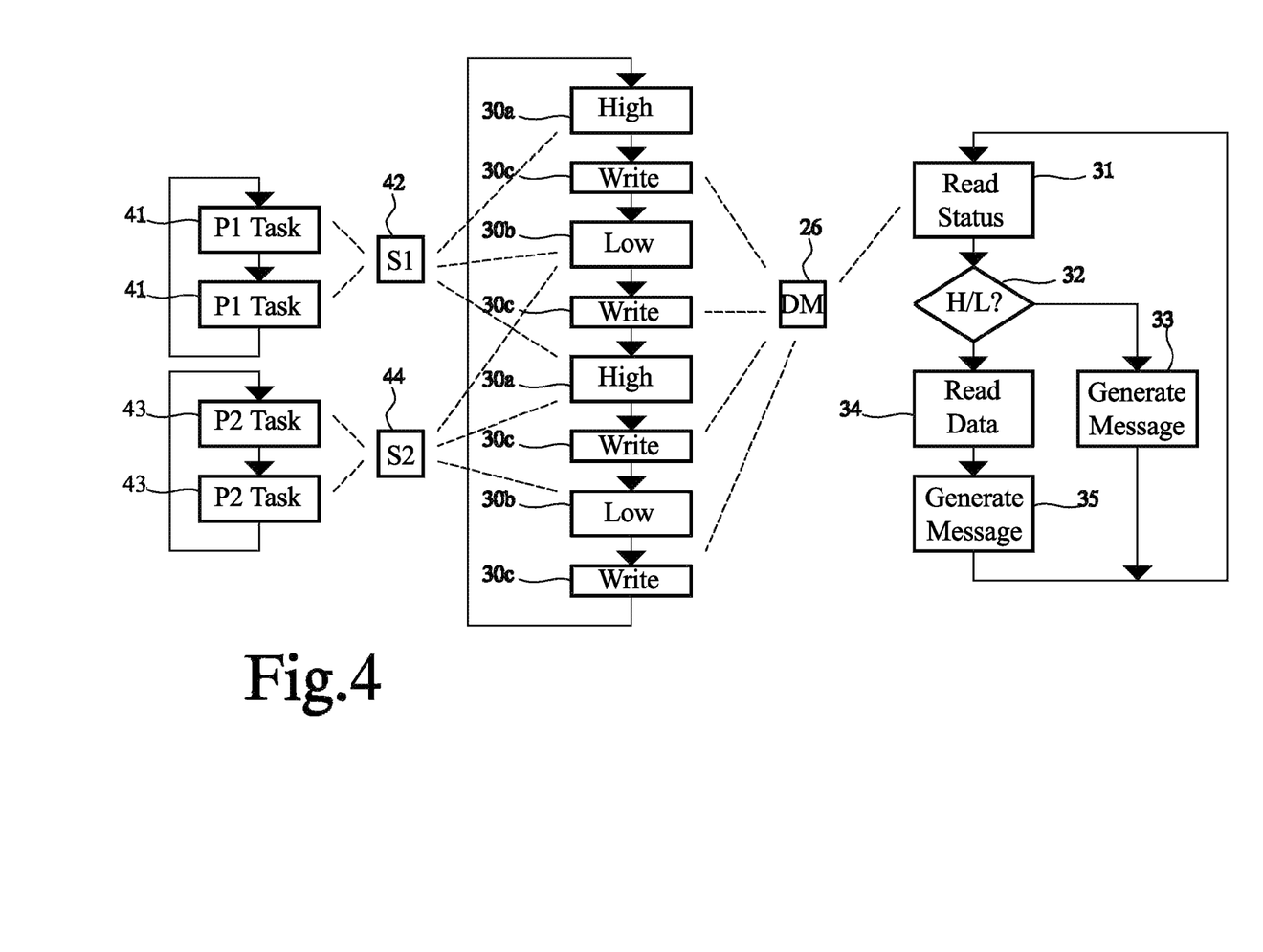

FIG. 4 shows a further flow chart, wherein the tasks performed by a plurality of processing elements are shown. In an example a first additional processing element 10 contains a specialized DCT computation circuit, e.g. for transforming a block of pixel values.

Further additional processing elements may be provided with circuits for executing other tasks, such as DCT coefficient quantization, run length encoding or decoding, motion compensation task (searching for a matching block of pixels, or copying a block of pixels from a location defined by a motion vector) etc. In this example the processing element 10 that performs processing tasks, including the task that generated cache message traffic, in time division multiplexed manner may for example execute a task to format a video stream or to extract information from a formatted video stream.

As shown stages 41 of a task performed by a first additional processing element 10 communicate information with the stages 30a-c of the first task via a first storage location 42. Similarly stages 43 of a task performed by a second additional processing element 10 communicate information with the stages 30a-c of the first task via a second storage location 44. The processing elements 10 are configured (i.e. they have a program or a hardware design) to sequence their operation so that the communicated information is used only after it has been produced. The communication has the effect that specific stages 41, 43 of the additional processing elements are executed only after corresponding steps in the processing element 10 that executes the stages 30a-c of the first task. The second task in that processing element uses the status information to control the amount of cache message traffic in combination with statistical information gained from the information from the buffered cache coherence requests. Thus, predictions about future cache coherence traffic from the additional processing elements may be used to control the generation of cache message traffic by the second task. In the embodiment with filter 28, the filter mode may be adapted dependent on these predictions.

In an embodiment the second task is provided only for verification purposes, to stress the circuit before normal use in order to determine whether it will function properly under extreme circumstances. In this embodiment execution of the second task may be omitted during normal use.

In another embodiment, the second task is provided for a purpose other than verification. In this embodiment the second task is active during normal use. In this embodiment case the task may be designed to avoid stress rather than to cause it. For example, the second task may be configured to delay operations that require heavy message traffic over communication circuit 14 until the predicted frequency of cache coherence requests or cache message traffic in general is below a threshold (i.e. to postpone the start of such operations or to suspend their execution). Such a prediction may be implicit and it may be based on program status plus actually observed cache coherence requests. Alternatively use may be made of an (implicit or explicit) prediction of cache coherence requests or cache messages traffic with addresses in a predetermined address range that is used by the operation that is delayed by the second task.

Predictions for this purpose may be based for example on statistics of requests or addresses that were observed during different program states, the statistic for a program state being used as the prediction when the first task indicates the program state. Predictions could also be provided by using statistics of recent cache coherence traffic, modified using information about the program state, e.g. by adding statistically determined addresses of increasing the statistical frequency according to predetermined values for the program state.

As another alternatively use may be made of an (implicit or explicit) prediction of the frequency of cache coherence requests with addresses in the predetermined address range, based on program status plus actually observed cache coherence requests.

Alternatively the second task may be configured to trigger other tasks that require little message traffic over communication circuit 14 when the frequency of cache coherence requests is high or program status indicates that tasks are active that will cause heavy traffic. As another example the second task itself may execute operations that cause heavy traffic or low traffic accordingly. For example, the second task, or a task that is triggered by it, may involve a step of writing to block of data in shared memory 12, which is started at a time of low predicted traffic. As another example, the second task, or a task that is triggered by it, may start a step that involves a large number of register to register computations with little cache message traffic at a time of high predicted traffic.

Although examples have been shown wherein status information is exchanged between the first and second task via configuration data memory 26, it should be appreciated that status information may be exchanged in other ways, for example by starting the second task from the first task at one or more programmable points in the first task.

As an alternative embodiment, the first and second task may be implemented in mutually distinct processing elements 10, which each have their own interface to communication circuit 14. In this alternative embodiment, communication between the processing elements is needed to exchange status information, preferably via a connection in parallel to communication circuit. Both processors may be coupled to configuration data memory 26 for example. As will be appreciated this makes it more difficult to respond to a combination of program state and cache coherence traffic.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. A computer program may be stored/distributed on a suitable computer readable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A processing element, comprising:
   a cache circuit configured to cache data from a memory shared by the processing element and another processing element;
   a cache coherence buffer configured to buffer information regarding cache coherence requests;
   a configuration data memory configured to store status information indicative of a stage being executed; and
   an instruction processor configured to execute a plurality of tasks, update the status information to indicate a task stage of the plurality of tasks being executed by the instruction processor, and generate cache coherence requests based on the status information and the buffered information.

2. The processing element of claim 1, wherein the instruction processor is further configured to generate the cache coherence requests at a rate based on the status information and the buffered information.

3. The processing element of claim 1, wherein the instruction processor is further configured to generate a type of cache coherence request based on the status information and the buffered information.

4. The processing element of claim 1, wherein the instruction processor is further configured to select addresses in the cache coherence requests based on the status information and the buffered information.

5. The processing element of claim 1, wherein the instruction processor is further configured to generate statistics based on the buffered information and program states of the instruction processor, and to generate the cache coherence requests based on the generated statistics.

6. The processing element of claim 1, wherein the instruction processor is further configured to determine a predicted frequency of cache coherence requests based on the status information and the buffered information, and delay execution of an operation in response to determining the predicted frequency is above a threshold.

7. A system, comprising:
a first processing element coupled to a shared memory via a communication circuit, wherein the first processing element is configured to cache data from the shared memory, and generate a signal indicative of a task stage that the first processing element is currently executing; and
a second processing element coupled to the communication circuit and configured to buffer information from cache coherence requests on the communication circuit, and generate cache coherence requests on the communication circuit based on the buffered information and the signal indicative of the task stage.

8. The system of claim 7, wherein:
the buffered information comprises addresses used in the cache coherence requests, and
the second processing element is configured to adapt addresses used in generated cache coherence requests based on the addresses of the buffered information and the signal indicative of the task stage.

9. The system of claim 7, wherein the second processing element is further configured to perform an operation that comprises generating a cache coherence request, determine a predicted frequency of cache coherence requests based on the buffered information and the signal indicative of the task stage, and delay execution of the operation in response to determining the predicted frequency is above a threshold.

10. The system of claim 7, wherein the second processing element is further configured to perform an operation that comprises generating a cache coherence request, determining based on the buffered information and the signal indicative of the task stage that an address of the cache coherence request is in an address range associated with a cache coherence frequency above a threshold, and delaying execution of the operation.

11. The system of claim 7, further comprising:
a filter configured to select information from the cache coherence requests;
wherein the second processing element is configured to buffer information selected by the filter.

12. The system of claim 11, wherein:
the second processing element is further configured to activate different modes of the filter based on the signal indicative of the task stage, and
the filter is configured to select information based on the active mode.

13. A method, comprising:
generating cache coherence requests in response to executing a plurality of tasks;
generating a signal indicative of a task stage of the plurality of tasks currently being executed;
buffering information from the generated cache coherence requests; and
adapting said generating cache coherence requests based on the buffered information and the signal indicative of the task stage.

14. The method of claim 13, wherein said adapting comprises generating the cache coherence requests at a rate based on the buffered information and the signal indicative of the task stage.

15. The method of claim 13, wherein said adapting comprises generating a type of cache coherence request based on the buffered information and the signal indicative of the task stage.

16. The method of claim 13, wherein said adapting comprises selecting addresses in the cache coherence requests based on the buffered information and the signal indicative of the task stage.

17. The method of claim 13, further comprising:
generating statistics based on the buffered information and a program state;
wherein said adapting comprises generating the cache coherence requests based on the generated statistics.

18. The method of claim 13, further comprising:
determining a predicted frequency of cache coherence requests based on the buffered information and the signal indicative of the task stage; and
delaying execution of an operation in response to determining the predicted frequency is above a threshold.

19. The method of claim 13, wherein said buffering comprises filtering the cache coherence requests based on an alterable filter mode to obtain the buffered information.

20. A non-transitory computer readable medium, comprising a plurality of instructions that, in response to being executed, result in a computing device:
generating cache coherence requests in response to executing a plurality of tasks;
generating a signal indicative of a task stage of the plurality of tasks currently being executed;
buffering information from the generated cache coherence requests; and
adapting said generating cache coherence requests based on the buffered information and the signal indicative of the task stage.

21. The non-transitory computer readable medium of claim 20, wherein the plurality of instructions further result in the computing device generating the cache coherence requests at a rate based on the buffered information and the signal indicative of the task stage.

22. The non-transitory computer readable medium of claim 20, wherein the plurality of instructions further result in the computing device generating a type of cache coherence request based on the buffered information and the signal indicative of the task stage.

23. The non-transitory computer readable medium of claim 20, wherein the plurality of instructions further result in the computing device selecting addresses in the cache coherence requests based on the buffered information and the signal indicative of the task stage.

24. The non-transitory computer readable medium of claim 20, wherein the plurality of instructions further result in the computing device generating statistics based on the buffered information and a program state, and generating the cache coherence requests based on the generated statistics.

25. The non-transitory computer readable medium of claim 20, wherein the plurality of instructions further result in the computing device determining a predicted frequency of cache coherence requests based on the buffered information and the signal indicative of the task stage, and delaying execution of an operation in response to determining the predicted frequency is above a threshold.

26. The non-transitory computer readable medium of claim 20, wherein the plurality of instructions further result in the computing device filtering the cache coherence requests based on an alterable filter mode to obtain the buffered information.

27. A system comprising:
    means for caching data from a shared memory;
    means for generating a signal indicative of a task stage that is being executed;
    means for buffering information from cache coherence requests; and
    means for generating cache coherence requests based on the buffered information and the signal indicative of the task stage.

28. The system of claim 27, wherein:
    the buffered information comprises addresses used in the cache coherence requests, and
    the means for generating cache coherence requests adapts addresses used in generated cache coherence requests based on the addresses of the buffered information and the signal indicative of the task stage.

29. The system of claim 27, further comprising a means for filtering the cache coherence requests to obtain the buffered information.

30. The system of claim 27, further comprising:
    means for executing an operation that includes generating a cache coherence request;
    means for determining a predicted frequency of cache coherence requests based on the buffered information and the signal indicative of the task stage; and
    means for delaying execution of the operation in response to determining the predicted frequency is above a threshold.

31. The system of claim 27, further comprising:
    means for executing an operation that comprises generating a cache coherence request;
    means for determining, based on the buffered information and the signal indicative of the task stage, whether an address of the cache coherence request is in an address range associated with a cache coherence frequency above a threshold; and
    means for delaying execution of the operation in response to determining that the address is in an address range associated with a cache coherence frequency above the threshold.

32. The system of claim 27, further comprising:
    means for activating different filter modes based on the signal indicative of the task stage, and
    a means for filtering the cache coherence requests based on an activated filter mode to obtain the buffered information.

* * * * *